United States Patent [19]

Coon

[11] 3,964,143  
[45] June 22, 1976

[54] HANDLE FOR HOLLOW FILE

[76] Inventor: James A. Coon, 929 Drever St., West Sacramento, Calif. 95691

[22] Filed: July 8, 1974

[21] Appl. No.: 486,437

[52] U.S. Cl. .................................................. 29/80
[51] Int. Cl.² ........................................ B23D 71/04
[58] Field of Search .................................. 29/78, 80

[56] References Cited
UNITED STATES PATENTS

| | | | |
|---|---|---|---|
| 1,147,204 | 7/1915 | Anheuser | 29/80 |
| 3,656,216 | 4/1972 | Coon | 29/80 |

FOREIGN PATENTS OR APPLICATIONS

| | | | |
|---|---|---|---|
| 976,509 | 10/1950 | France | 29/80 |

Primary Examiner—Leonidas Vlachos  
Attorney, Agent, or Firm—Blair & Brown

[57] ABSTRACT

A replaceable handle for a hollow file which includes an elongate metal bar having a reverted hook formed on the outer end thereof with the opposite end having an upstanding portion extending perpendicularly to the bar. A hand grip portion extends perpendicularly from the upper end of the upstanding portion generally parallel to the bar. A threaded stud extends rearwardly from the upstanding portion and a channel shaped hook member is mounted on the threaded stud. A thumb nut is threaded onto the threaded stud engaging the hook member to force it toward the hook member at the other end of the bar to clamp the upper surface of a hollow file therebetween.

1 Claim, 6 Drawing Figures

U.S. Patent June 22, 1976 3,964,143
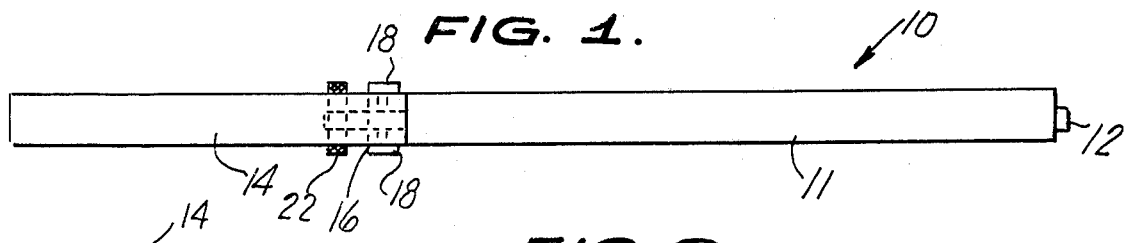
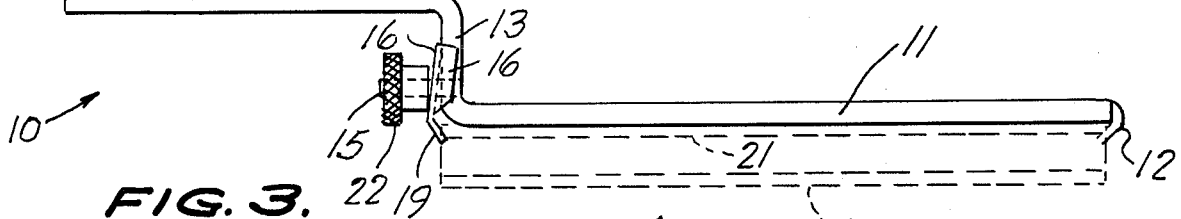
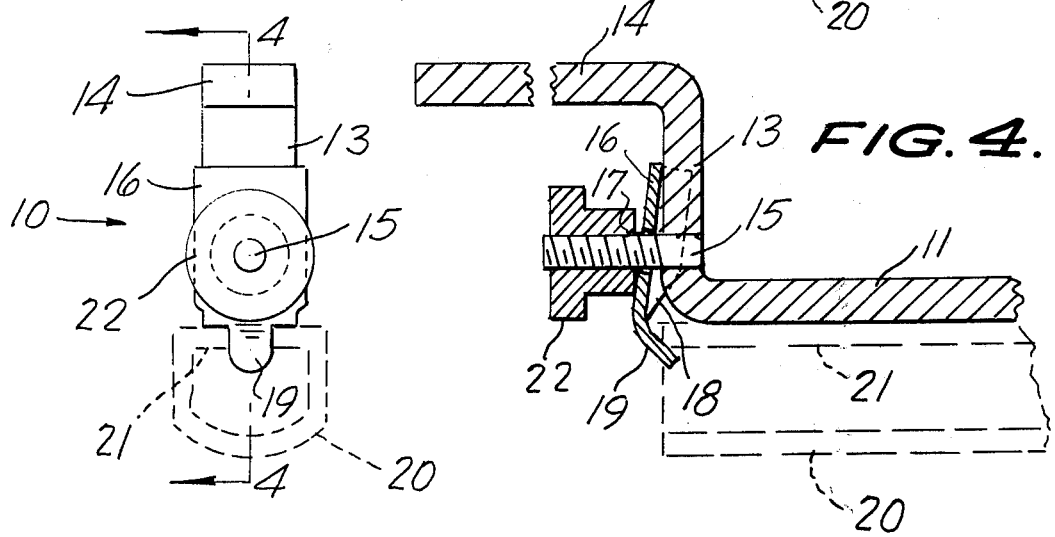
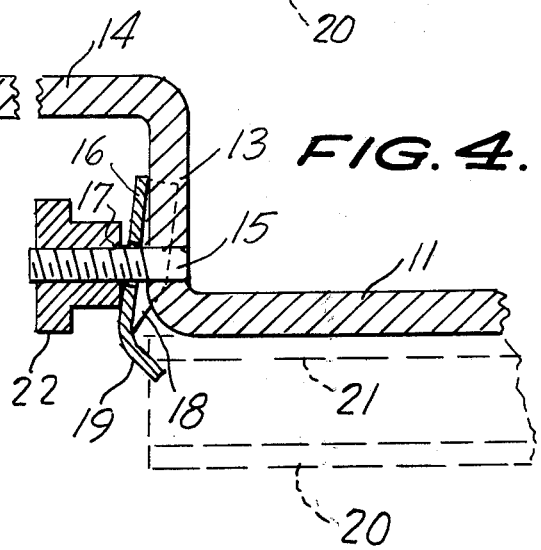
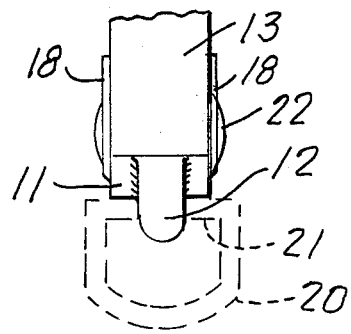
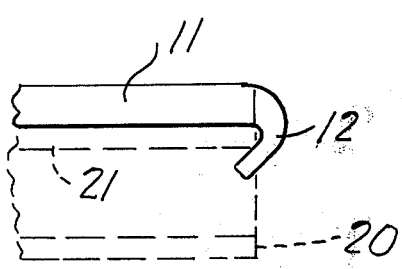

HANDLE FOR HOLLOW FILE

BACKGROUND OF THE INVENTION

FIELD OF THE INVENTION

The present invention relates to replaceable handles for hollow files.

SUMMARY OF THE INVENTION

The replaceable handle includes an elongate flat bar of metal having a hook integrally formed on the outer end thereof with an upstanding portion integrally formed on the opposite end thereof. The upstanding portion extends perpendicularly to the elongate portion and terminates at it's upper end in a hand grip portion which extends generally parallel to the elongate portion. A threaded stud extends perpendicularly outwardly from the upstanding portion to receive a channel shaped hook member and a thumb nut provided for forcing the channel shaped hook member toward the hook member at the outer end of the elongate portion to clamp the upper wall of a hollow file therebetween.

The primary object of the invention is to provide an inexpensive easily detachable handle for hollow files which may be removed to replace a dull file.

Other objects and advantages will become apparent in the following specification when considered in light of the attached drawings.

BRIEF DESCRIPTION OF THE DRAWINGS

FIG. 1 is a top plan view of the invention;

FIG. 2 is a side elevation of the invention;

FIG. 3 is an end elevation of the invention, from the hand grip end thereof;

FIG. 4 is a fragmentary longitudinal sectional view taken along the line 4—4 of FIG. 3, looking in the direction of the arrows;

FIG. 5 is a fragmentary end elevation from the end opposite FIG. 3; and

FIG. 6 is an enlarged fragmentary side elevation of the outer end portion of the invention.

DESCRIPTION OF THE PREFERRED EMBODIMENT

Referring now to the drawings in detail, wherein like reference characters indicate like parts throughout the several figures, the reference numeral 10 indicates generally a hollow file replaceable handle constructed in accordance with the invention.

The handle 10 includes an elongate flat metal bar 11 having a reverted hook 12 of reduced cross section integrally formed on the outer end thereof. The bar 11 has an integral upstanding portion 13 extending perpendicularly thereto at the end thereof opposite the hook 12.

A hand grip member 14 is integrally formed on the upper end of the upstanding portion 13 and extends generally parallel to the bar 11 as can be best seen in FIGS. 2 and 4.

A threaded stud 15 extends through the upstanding portion 13 and extends perpendicularly thereto in a direction away from the bar 11. A channel hook member 16 has a bore 17 formed therein to engage over the threaded stud 15. Opposed flanges 18 on the hook member 16 engage opposite sides of the upstanding portion 13 to prevent the hook member 16 from rotating on the threaded stud 15. A tang 19 extends at an angle to the hook member 16 toward the hook member 12 as can be clearly seen in FIG. 2.

The hollow file replaceable handle 10 is adapted for use with any hollow file such as is shown in broken lines at 20 having an upper wall 21 the opposite ends of which are grasped by the hook 12 and the tang 19 so that the thumb screw 22 threaded onto the threaded stud 15 can force the hook member 16 toward the hook 12 to clamp the upper wall 21 of the file 20 therebetween.

The hollow file 20 is illustrated as a half round configuration but it should be understood that the handle 10 may be used with any hollow file which includes an upper wall such as 21 to be engaged by the hook 12 and the hook 16.

Having thus described the preferred embodiment of the invention it should be understood that numerous structural modifications and adaptations may be resorted to without departing from the spirit of the invention.

I claim:

1. A hollow file replaceable handle comprising an elongate bar, a hook integrally formed on one end of said bar, a second hook positioned adjacent the opposite end of said bar in opposed relation to said first hook, an integral upstanding portion on said bar, a threaded stud extending perpendicularly from said upstanding portion with said second hook mounted thereon, a thumb nut threaded on said threaded stud for engaging said second hook to move said second hook toward said first hook, said second hook being channel shaped and having a downward extending curved tang extending inside the hollow file toward the first hook and having opposing flanges along its insides to straddle the upstanding portion, and hand grip means extending integrally from said upstanding portion.

* * * * *